Patented Mar. 13, 1928.

1,662,420

UNITED STATES PATENT OFFICE.

PAUL HARTMANN, OF NEW YORK, N. Y., ASSIGNOR TO KARL SCHENZER, OF NEW YORK, N. Y.

METHOD FOR PREPARATION OF WASHABLE ANILINE DYES.

No Drawing. Application filed November 26, 1926, Serial No. 151,026. Renewed January 25, 1928.

This invention relates to dyes and particularly to dyes having aniline as a base.

It is the principal object of the present invention to produce a dye which is positively "fast" in the sense of being permanent.

A further feature is in the provision of a dye readily and inexpensive to manufacture, capable of being maintained for an indefinite period of time without deterioration and of use in such quantity as may be required.

The composition consists of a mixture of aniline crystals, boracic acid and soda mixed in solution and afterwards dried and pulverized in accordance with the following formula.

In preparing the dye, the aniline crystals are dissolved in pure cold water, one part by weight of the crystals in twenty-five to thirty parts by weight of water.

Another solution is made of boracic acid and distilled water, one part by weight of boracic acid and thirty parts by weight of water.

These solutions are then intimately mixed and subjected to heat, the cooking and stirring continued until the solution thickens, the boracic acid and soda acting as a flux or mordant.

The thickened mass is placed in a vacuum pan and steamed until completely dry.

After cooling the resultant cake is ground to a powder and ready for use.

An alternative composition is prepared by dissolving one part of aniline crystals in twenty-five to thirty parts pure water and mix with a boracic acid solution in a soda water apparatus under a pressure of substantially ninety atmospheres.

Then withdraw the air, permitting the acid to act on the aniline solution for six to eight hours.

Thereafter the resultant mass is placed in a vacuum pan and heated until dry, the residue being finely pulverized.

The prepared powder may be kept indefinitely or used at once as may be required and experience has demonstrated that a dye so made is efficacious in coloring textile fabric and moreover is substantially permanent.

Having thus described my invention, what I claim as new and desire to secure by Letters Patent, is:—

1. The process of making a permanent dye consisting of mixing a solution of aniline crystals, a second solution of boracic acid, mixing the solutions intimately, evaporating to dryness and pulverizing the dry mass so obtained.

2. The process of making a permanent dye consisting of mixing a solution of aniline crystals, one part by weight in thirty parts by weight of water, making a second solution of one part by weight of boracic acid in thirty parts by weight of water, mixing the two solutions, evaporating to dryness in vacuum pan, and pulverizing the residue to a fine powder.

In witness whereof I have affixed my signature.

PAUL HARTMANN.